United States Patent [19]
Uozumi et al.

[11] Patent Number: 6,046,887
[45] Date of Patent: Apr. 4, 2000

[54] SUSPENSION FOR DISC DRIVE

[75] Inventors: Koji Uozumi, Isehara; Jun Soga, Atsugi; Ichiro Takadera, Tokyo; Osamu Ohkawara, Aikawa-machi; Eiji Kuranari, Yokohama, all of Japan

[73] Assignee: NHK Spring Co., Ltd., Yokohama, Japan

[21] Appl. No.: 09/112,432

[22] Filed: Jul. 9, 1998

[30] Foreign Application Priority Data

Jul. 11, 1997 [JP] Japan ................................. 9-186649

[51] Int. Cl.[7] ............................................. G11B 5/48
[52] U.S. Cl. ................................................ 360/104
[58] Field of Search .......................... 360/104–106, 360/97.01

[56] References Cited

U.S. PATENT DOCUMENTS 5,862,010   1/1999   Simmons et al. ................ 360/97.01
5,914,834   6/1999   Gustafson ............................ 360/104
5,943,191   8/1999   Giere et al. ......................... 360/104

FOREIGN PATENT DOCUMENTS 5-282642   10/1993   Japan .

*Primary Examiner*—Allen T. Cao
*Attorney, Agent, or Firm*—Frishauf, Holtz, Goodman, Langer & Chick, P.C.

[57] ABSTRACT

A suspension comprises a load beam made of a thin metal plate, a flexure made of a thinner metal plate than this load beam and fixed to the load beam, and a wiring portion. The flexure includes a tongue, and a pair of outrigger portions positioned at both sides of the tongue. A slider is provided on the tongue. The wiring portion includes an electrical insulating resin layer provided on the flexure, and an electrical conductive layer laminated on this electrical insulating resin layer. The wiring portion further includes a middle flexible part along the outrigger portions. This middle flexible part is separated from the tongue and outrigger portions, and is in a suspended state in a slit between the tongue and outrigger portions.

7 Claims, 4 Drawing Sheets

SUSPENSION FOR DISC DRIVE

BACKGROUND OF THE INVENTION

The present invention relates to a suspension for supporting the slider of a disc drive incorporated in an information processing apparatus such as personal computer and portable computer, and more particularly to an improvement of its wiring portion and others.

In a head of a magnetic disc drive or optical-magnetic disc drive, the slider is slightly floating above the disc rotating at high speed. A transducer is built in this slider, and recording or reproducing of data in the disc is performed through this transducer. Accordingly, the slider is supported by a suspension so as to be in a floating state from the disc.

As this kind of suspension, as disclosed, for example, in Jpn. Pat. Appln. KOKAI Publication No. 5-282642, the slider is fixed on a gimbal (or also known as flexure) provided in a load beam. A known suspension 1 shown in FIG. 8 has a flexure 3 composed of a very thin metal plate fixed to the leading end of a load beam 2. A tongue 4 is provided in this flexure 3, and a slider 5 is supported by this tongue.

At both sides of the tongue 4, a pair of outrigger portions 6 are provided. The tongue 4 is inclined at a slight pitch angle of 2 to 3 or less degrees to the outrigger portions 6 as seen from its side. A terminal 7 of the slider 5 is connected to a wiring portion 8. The wiring portion 8 is provided in the flexure 3, and an outer lead wire not shown in the drawing is connected to the other end of the wiring portion 8.

The wiring portion 8 is generally composed of an electric insulating layer made of synthetic resin such as polyimide formed on a metal plate for composing the flexure 3, an electric conductive layer made of copper or the like provided on this electric insulating layer, a guard layer made of synthetic resin such as polyimide laminated as required on this electric conductive layer, and others. The electric conductive layer is patterned by known film forming technology and etching.

The synthetic resin such as polyimide used in the electric insulating layer and guard layer is deformed by expansion or shrinkage due to temperature changes, moisture absorption, or dehumidifying. Accordingly, if the wiring portion is fixed to a thin and low-rigid metal plate such as the outrigger portions, in case the wiring portion is deformed, the outrigger portions may be also deformed. The slider fixed on the tongue is largely changed in its floating characteristic from the disc depending on its fixed state, and therefore if the flexure is deformed as mentioned above, the slider position is also changed, and the desired floating characteristic may not be obtained.

In the case of bending process for providing the tongue with the pitch angle, tensile stress or torsional stress may occur in the wiring portion due to processing. Such stress works as a spring-back force to return the processed shape to the original state. Thus, the rigidity of the wiring portion is a hindrance to bending process of the tongue at high precision. In particular, the problem is more obvious when a relatively rigid metal such as rolled copper is used in the electric conductive layer of the wiring portion.

BRIEF SUMMARY OF THE INVENTION

It is hence an object of the invention to present a suspension for disc drive capable of preventing or lessening the effect of deformation of the wiring portion on the flexure and other parts, and bending the tongue and others at high precision.

To achieve the object, the suspension of the invention comprises a flexure having a tongue which is provided inside of a pair of outrigger portions and to which a slider is fixed on this tongue, a load beam for supporting the flexure, and a wiring portion connected electrically to the slider. This wiring portion includes a synthetic resin layer provided on the flexure, and an electric conductive layer laminated on this resin layer, and the wiring portion further includes a main part fixed to the flexure, a middle flexible part in a suspended state along the outrigger portions and separated from the tongue and outrigger portions, and a terminal part provided at an end of the electric conductive layer and connected electrically to a terminal of the slider.

According to the invention, since the wiring portion includes the middle flexible part, effects of deformation or stress of the wiring portion on the outrigger portions and tongue may be lessened. As a result, if the wiring portion is deformed, the change of pitch angle of the tongue is small, and the position of the slider is stable. Moreover, since the wiring portion and outrigger portions are separate, when the tongue is bent or processed to form a pitch angle, occurrence of local high stress in the wiring portion can be avoided. Accordingly, the reliability of the wiring portion is enhanced, and the force from the wiring portion for returning the tongue shape to the original state is reduced, so that the processing precision of the tongue is enhanced.

The invention further includes a constitution in which the middle flexible part is disposed inside of the outrigger along the slit between the outrigger portions and tongue. In this constitution, when handling the suspension in the manufacturing process of the suspension, hands of the worker rarely touch the middle flexible part of the wiring portion, and it is effective to prevent damage of the wiring portion.

In the invention, preferably, a direction changing part directed toward the terminal is formed at the leading end side of the wiring portion, and this direction changing part and the middle flexible part are disposed in a suspended state in the slit between the tongue and outrigger portions. According to this constitution, the wiring portion is more flexible to deflect.

Also in the invention, a curved portion is formed in a part in the longitudinal direction of the middle flexible part. According to this constitution, the rigidity of the middle flexible part is further decreased.

Further in the invention, the electric conductive layer of the wiring portion is made of galvanized copper which is lower in rigidity than the rolled copper. The galvanized copper is a substantially pure copper. Generally, the flexure is preferred to be low in rigidity so that the position of the slider can be changed flexibly. In this invention, by using a substantially pure copper in the electric conductive layer, the rigidity of the wiring portion can be further lowered and influence of the rigidity of the wiring portion on the rigidity of the flexure can be reduced. Therefore, without lowering the rigidity of the suspension in the lateral direction, the pitch stiffness and roll stiffness can be lowered, so that the degree of freedom of design of the suspension is extended.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the invention is described below by referring to a suspension 10 for hard disc drive (hereinafter HDD) shown in FIG. 1 through FIG. 6.

Figure 5:
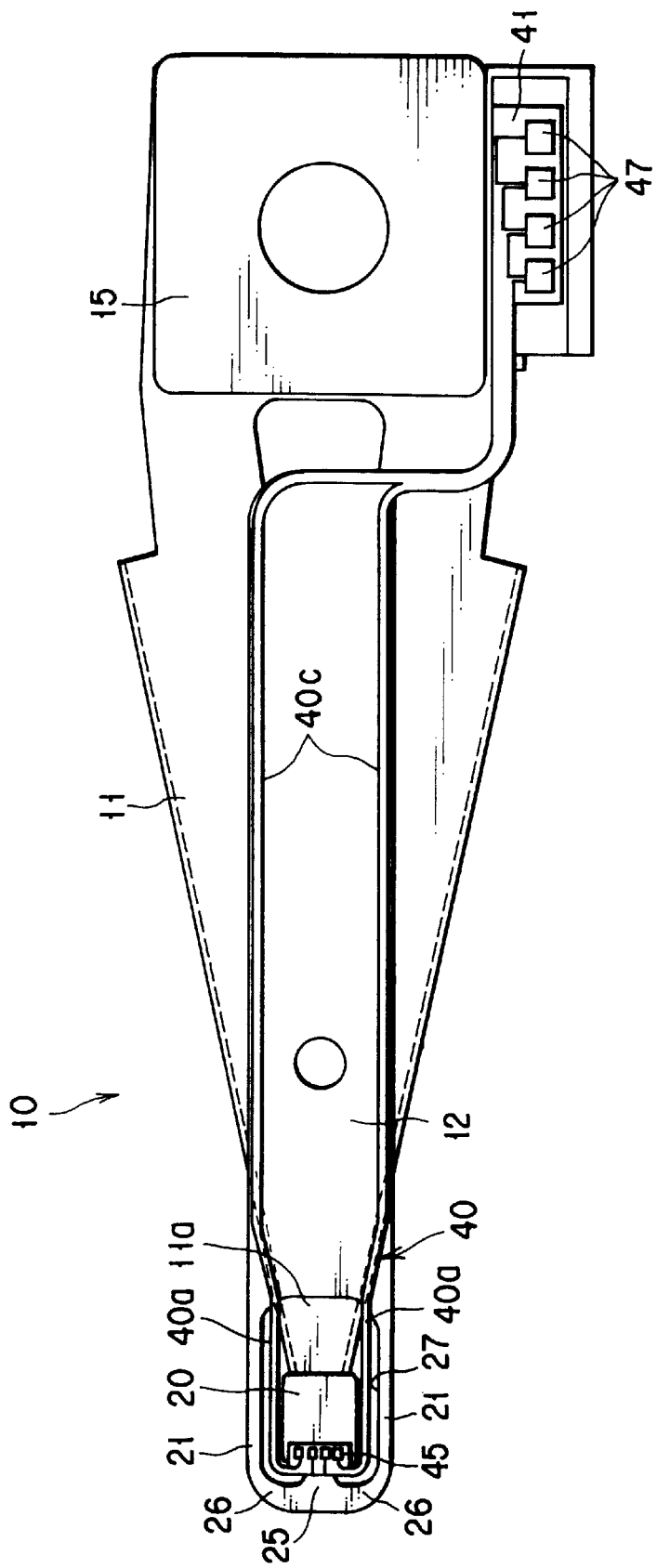
FIG. 5 is an entire plan view of the suspension shown in FIG. 1.
Figure 6:
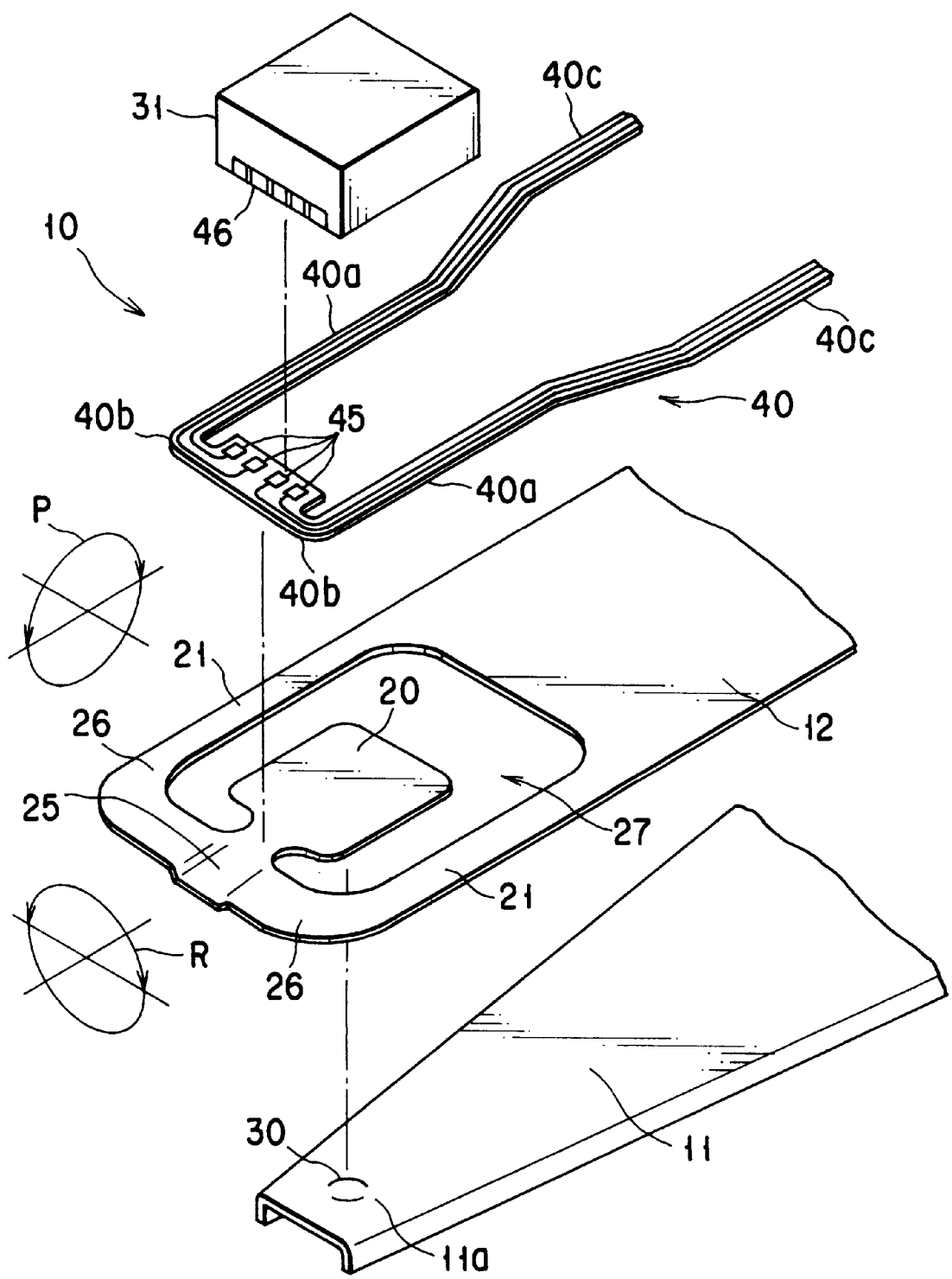
FIG. 6 is a partial perspective exploded view of the suspension shown in FIG. 1.

An example of the suspension 10 shown in FIG. 5 and FIG. 6 comprises a load beam 11 made of a precise thin plate spring of metal such as stainless steel, and a flexure 12 made of a thinner plate spring of metal than that of the load beam 11 and fixed to the load beam 11. The flexure 12 is made of a thin stainless steel plate having spring characteristic of, for example, about 18 μm to 30 μm, and is fixed to the load beam 11 by laser welding or similar technique.

At the base of the load beam 11, a base plate 15 is provided. Through this base plate 15, the load beam 11 is fixed to a carriage (not shown). The carriage is driven by a known motor for positioning (not shown), and it is designed so that the leading end side of the flexure 12 can move up to a desired track of a recording medium such as hard disc.

As shown in FIG. 5, the flexure 12 is extended in the axial direction (longitudinal direction) of the load beam 11. At the leading end portion of this flexure 12, a tongue 20 is formed, and at both right and left sides of the tongue 20, a pair of outrigger portions 21 extending in the longitudinal direction of the flexure 12 are formed.

As shown in FIG. 6, a front end 25 of the tongue 20 is consecutive to a front end of the outrigger portions 21 through a linkage 26 extending in the width direction of the flexure 12. That is, around the tongue 20, a slit 27 is formed in a U form in a plan view with the front end 25 left by etching. This slit 27 is defined by the outer circumference of the tongue 20, the outrigger portions 21, and the linkage 26.

Figure 4:
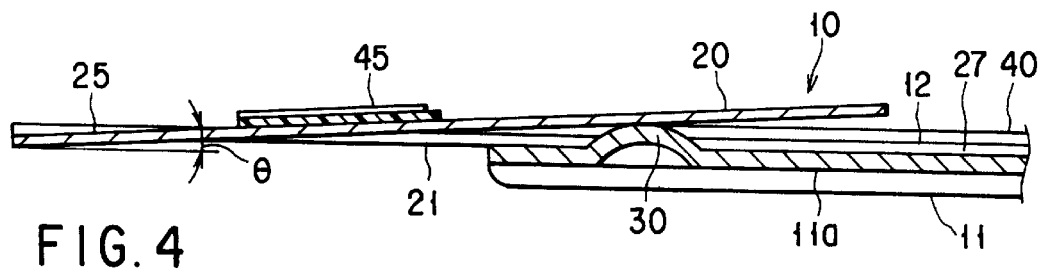
FIG. 4 is a sectional view along line IV—IV in FIG. 1.

The tongue 20 is bent and processed so as to be inclined at a pitch angle θ of, for example, 2 to 3 or less degrees as seen from the side as shown in FIG. 4. The back side of the tongue 20 abuts against a bump 30 provided at the leading end portion 11a of the load beam 11. A slider 31 (shown in FIG. 6) is fixed to the tongue 20. A magnetoelectric transducer (not shown) is provided in the slider 31.

Figure 3:
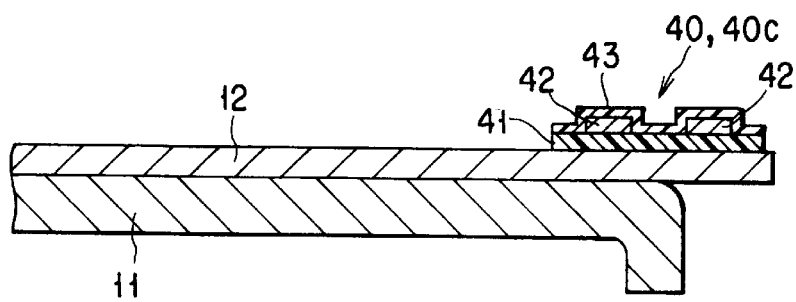
FIG. 3 is a sectional view along line III—III in FIG. 1.

A wiring portion 40 is provided on the flexure 12. This wiring portion 40 is composed of, as shown in FIG. 3 and others, an electric insulating resin layer 41 made of an electric insulating synthetic resin such as polyimide of about 3 to 20 μm in thickness provided on the surface of a metal plate for composing the flexure 12, an electric conductive layer 42 of a specified thin film pattern laminated on this electric insulating resin layer 41, and a guard resin layer 43 of about 1 to 5 μm in thickness made of a synthetic resin such as polyimide for covering the electric conductive layer 42.

The electric conductive layer 42 is made of galvanized copper (pure copper substantially) of which rigidity is smaller than that of rolled copper (an alloy composed of Cu, Ni, Si, Mg, etc.), and its thickness is about 3 to 18 μm. This electric conductive layer 42 is patterned in a specified shape after film forming process such as plating, and etching process. If necessary, moreover, at least part of the electric conductive layer 42 may be covered with nickel or gold.

Figure 1:
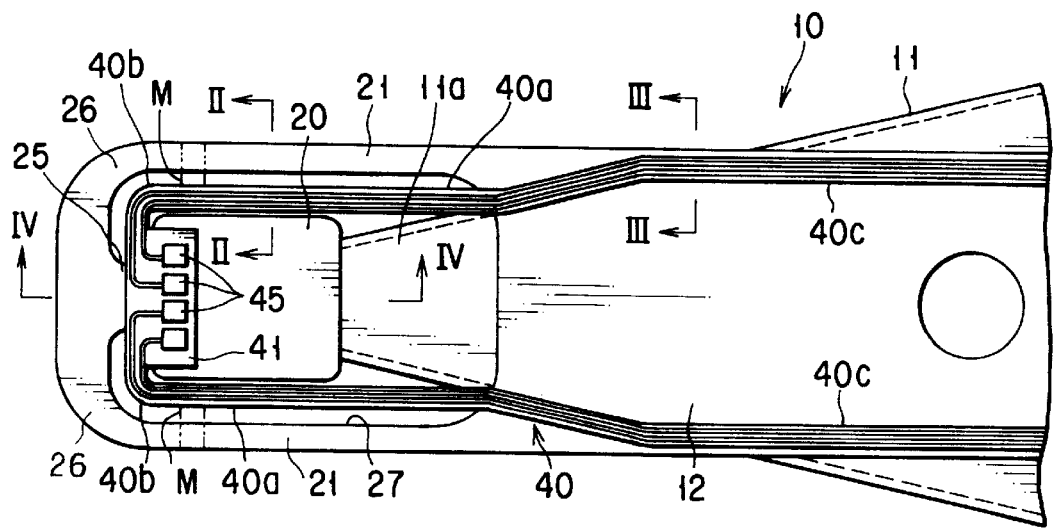
FIG. 1 is a plan view of a part of a suspension for disc drive showing an embodiment of the invention.
Figure 2:
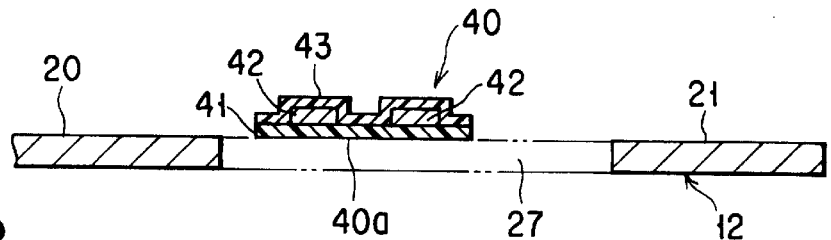
FIG. 2 is a sectional view along line II—II in FIG. 1.

As shown in FIG. 1, a first terminal part 45 is provided at an end side of the wiring portion 40. This terminal part 45 is formed integrally with the electric conductive layer 42, and is electrically connected to a terminal 46 of the slider 31 at the front end 25 of the tongue 20.

As shown in FIG. 5, other end side of the wiring portion 40 is extended in the longitudinal direction of the flexure 12, and a second terminal part 47 is provided near the base plate 15. The second terminal part 50 is formed integrally with the electric conductive layer 42 on the surface of the electric insulating resin layer 41 near the base plate 15. An external led wire not shown in the drawing is connected to this terminal part 47.

The wiring portion 40 has a middle flexible part 40a in a suspended state being separated from the tongue 20 and outrigger portions 21, in a region along the outrigger portions 21. To form this middle flexible part 40a in a suspended state, prior to etching of the slit 27, the wiring portion 40 is patterned on the flexure 12, and when etching the slit 27, a part of the wiring portion 40, that is, the middle flexible part 40a is left over at the slit 27.

This middle flexible part 40a is disposed inside of the outrigger portions 21 along the slit 27 and outrigger portions 21. At the leading end side of the wiring portion 40, a direction changing part 40b is formed so that the electric conductive layer 42 may be directed toward the terminal part 45. This direction changing part 40b is also disposed in a suspended state in the slit 27. The main part 40c of the wiring portion excluding the middle flexible part 40a and direction changing part 40b is fixed on the surface of the flexure 12 as shown in FIG. 3.

Thus, the middle flexible part 40a and direction changing part 40b along the outrigger portions are separated from the tongue 20 and outrigger portions 21. Accordingly, if the wiring portion 40 is deformed by moisture absorption, dehumidifying or temperature changes of the resin layers 41, 43, such deformation is absorbed by the middle flexible part 40a and direction changing part 40b in a suspended state. Therefore, effects of the deformation of the wiring portion 40 on the tongue 20 and outrigger portions 21 can be avoided, deformation of the outrigger portions 21 is suppressed, and the pitch angle θ of the tongue 20 is accurate. Since the majority of the flexure 12, that is, the region excluding the tongue 20 and outrigger portions 21 is fixed to the load beam 11 of which thickness is several times more than the flexure 12, it is not deformed by stress occurs in the wiring portion 40.

Figure 8:
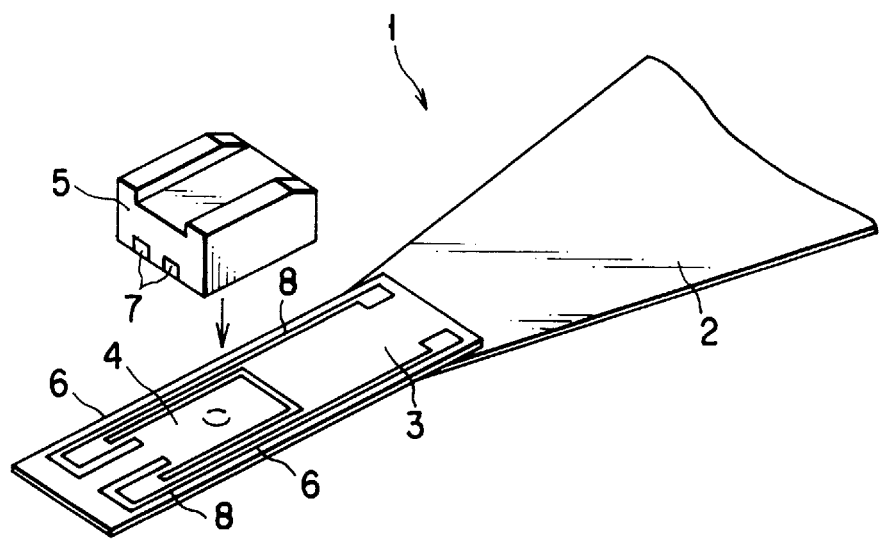
FIG. 8 is a perspective view showing a part of a conventional suspension.

The present inventors conducted experiments to see how the pitch angle θ of the tongue 20 would be changed by moisture absorption of the wiring portion 40 of the suspension 10 in this embodiment. As a result, the change of the pitch angle θ was confirmed to be as small as about 0.05 deg. By contrast, in the constitution in which the wiring portion is fixed to the outrigger portions as in the prior art (FIG. 8), the change of the pitch angle of the tongue was about 0.3 deg, and the effect of deformation of the wiring portion was known to be significant. That is, in the suspension 10 of the embodiment, the pitch angle change of the tongue 20 is about one-sixth of the prior art, and the precision of the tongue 20 has been improved remarkably.

Incidentally, in a comparative example by connecting a part of the wiring portion 40 to the outrigger portions 21 through a part of the resin layer 41 as indicated by double dot chain line M in FIG. 1, by moisture absorption of the wiring portion 40, the pitch angle change of the tongue 20 was found to be about four times larger than in the suspension 10 of the embodiment.

The pitch stiffness (rigidity in the direction of arrow P in FIG. 6) of the suspension 10 in the invention was 0.72 $\mu$N-m/deg, and the roll stiffness (rigidity in the direction of arrow R) was 1.22 $\mu$N-m/deg. By contrast, in the comparative example, the pitch stiffness was 0.84 $\mu$N-m/deg, and the roll stiffness was 1.36 $\mu$N-m/deg. That is, the suspension 10 of the invention is found to be lowered in rigidity by about 10% as compared with that of the comparative example.

In the suspension 10, the metal plate for composing the flexure 12 and the middle flexible part 40a of the wiring portion 40 are separate from each other. Accordingly, if the tongue 20 is bent and processed to form a pitch angle $\theta$, distortion occurring in the wiring portion 40 is distributed, so that the effect on the flexure 12 is notably decreased, which is another advantage. Fluctuations of the pitch angle $\theta$ of the suspension in the embodiment are known to be decreased to about half or one-third as compared with fluctuations of the pitch angle $\theta$ by fixing the wiring portion 40 to the outrigger portions 21.

Figure 7:
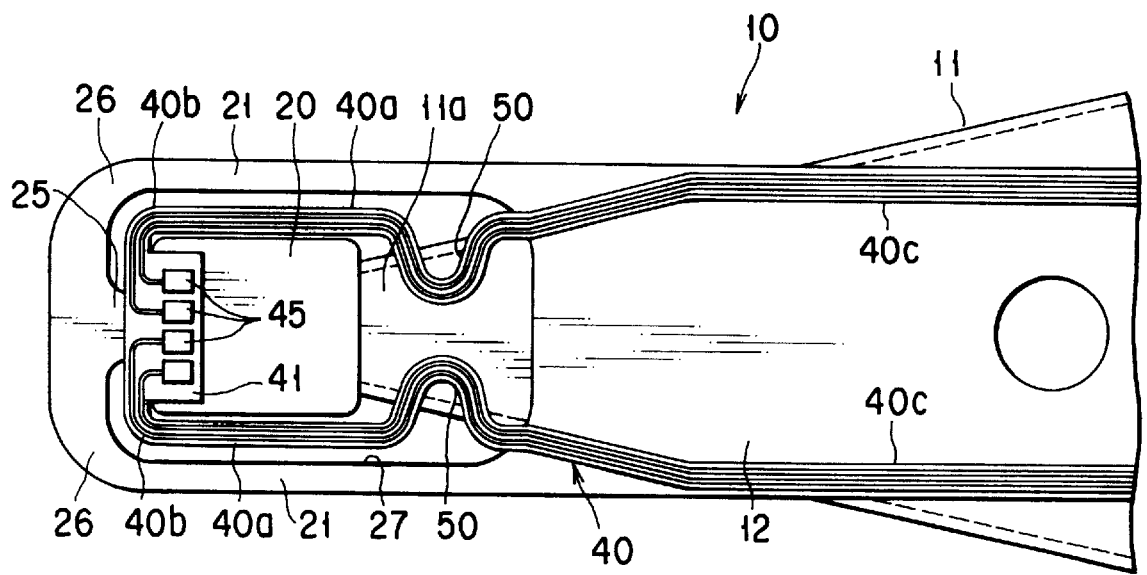
FIG. 7 is a partial plan view of the suspension showing a modified example of wiring portion.

Moreover, as shown in a modified example of the wiring portion 40 in FIG. 7, by forming a curved portion 50 curved in an arc in a part of the longitudinal direction of the middle flexible part 40a, the wiring portion 40 is more flexible to deflect. As a result, effects of deformation or stress of the wiring portion 40 on the tongue 20 or outrigger portions 21 can be more effectively prevented. The basic constitution and effects of the suspension 10 shown in FIG. 7 are same as in the foregoing embodiment (FIG. 1 through FIG. 6), and same reference numerals are given to the common parts of the two and description is omitted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A suspension for a disc drive comprising:
    a flexure having a pair of outrigger portions, and a tongue which is provided inside of the outrigger portions and to which a slider is fixed;
    a load beam for supporting the flexure; and
    a wiring portion including a synthetic resin layer provided on the flexure, and an electric conductive layer laminated on the resin layer, and having a main part fixed on the flexure, a middle flexible part in a suspended state along the outrigger portions and separated from the tongue and outrigger portions, and a terminal part provided at an end of the electric conductive layer and connected electrically to the slider.

2. A suspension for a disc drive according to claim 1, wherein:
    a slit is defined between the outrigger portions and the tongue, and the middle flexible part is disposed between the outrigger portions and the tongue along the slit.

3. A suspension for a disc drive according to claim 2, wherein:
    the wiring portion has a direction changing part for directing the electric conductive layer toward the terminal part, near the terminal part, and wherein the directing changing part and the middle flexible part are disposed in the slit in a suspended state.

4. A suspension for a disc drive according to claim 2, wherein:
    the middle flexible part has a curved part in a shape curved in an arc in its longitudinal direction.

5. A suspension for a disc drive according to claim 3, wherein:
    the middle flexible part has a curved part in a shape curved in an arc in its longitudinal direction.

6. A suspension for a disc drive according to claim 1, wherein:
    the electric conductive layer of the wiring portion is made of galvanized copper of substantially pure copper.

7. A suspension for a disc drive according to claim 2, wherein:
    the electric conductive layer of the wiring portion is made of galvanized copper of substantially pure copper.

* * * * *